(12) United States Patent
Weaver et al.

(10) Patent No.: US 10,128,909 B2
(45) Date of Patent: Nov. 13, 2018

(54) SUBSEA CONTACTLESS CONNECTOR SYSTEM AND METHOD WITH EXTREMELY HIGH DATA TRANSFER RATE

(71) Applicant: Oceaneering International, Inc., Houston, TX (US)

(72) Inventors: David Wesley Weaver, Severna Park, MD (US); Thomas Knight Tolman, Annapolis, MD (US)

(73) Assignee: Oceaneering International, Inc., Houston, TX (US)

(*) Notice: Subject to any disclaimer, the term of this patent is extended or adjusted under 35 U.S.C. 154(b) by 3 days.

(21) Appl. No.: 15/375,250

(22) Filed: Dec. 12, 2016

(65) Prior Publication Data
US 2017/0170876 A1    Jun. 15, 2017

Related U.S. Application Data

(60) Provisional application No. 62/266,267, filed on Dec. 11, 2015.

(51) Int. Cl.
*H04B 5/00* (2006.01)
*H04B 13/02* (2006.01)
(Continued)

(52) U.S. Cl.
CPC ........... *H04B 5/0031* (2013.01); *G07C 5/008* (2013.01); *H02J 50/12* (2016.02); *H04B 5/0037* (2013.01); *H04B 13/02* (2013.01); *H04W 52/30* (2013.01)

(58) Field of Classification Search
CPC ......... G07C 5/008; H02J 50/12; H04B 13/02; H04B 5/0031; H04B 5/0037
See application file for complete search history.

(56) References Cited

U.S. PATENT DOCUMENTS 5,676,576 A * 10/1997 Shonting .................. B63G 8/38
441/1
5,794,701 A * 8/1998 Cunningham ........ E21B 43/013
166/341
(Continued)

FOREIGN PATENT DOCUMENTS

WO    WO 2017100735 A1 *  6/2017
WO    WO 2017100736 A1 *  6/2017

*Primary Examiner* — Devan Sandiford
(74) *Attorney, Agent, or Firm* — Maze IP Law PC

(57) ABSTRACT

A pinless connector for subsea data communications comprises contactless connectivity data transmitter coupler, comprising one or more first solid state contactless connectivity data transmitters, and contactless connectivity data receiver coupler, comprising one or more first solid state contactless connectivity data receivers, which can allow for rapid collection and/or download data from subsea vehicles or sensors without having to plug in an external connector or physically remove the data recorder from the unit. Typically, these are operative at a low power level, e.g. less than or around 50 milliwatts, at an extremely high data transfer rate or around 5 GBits/second. The connectors may be incorporated into a subsea system comprising two subsea devices. A slip ring system may similarly comprise one or more first solid state contactless connectivity data transmitters and one or more first solid state contactless connectivity data receivers.

33 Claims, 2 Drawing Sheets

(51) Int. Cl.
*G07C 5/00* (2006.01)
*H04W 52/30* (2009.01)
*H02J 50/12* (2016.01)

(56) References Cited

U.S. PATENT DOCUMENTS

| | | | | |
|---|---|---|---|---|
| 8,576,667 B2* | 11/2013 | Rhodes | H04B 13/02 | 367/131 |
| 8,841,881 B2* | 9/2014 | Failing | B60L 3/00 | 320/109 |
| 8,946,941 B2* | 2/2015 | Maughan | H01F 38/14 | 307/104 |
| 9,301,258 B2* | 3/2016 | Preusser | H04W 4/006 | |
| 9,490,911 B2* | 11/2016 | Hopewell | H04B 10/80 | |
| 9,595,833 B2* | 3/2017 | Isfeldt | G01V 1/38 | |
| 2002/0132589 A1* | 9/2002 | Kojima | B60R 16/027 | 455/73 |
| 2002/0180279 A1* | 12/2002 | Faizullabhoy | H02K 41/03 | 310/12.19 |
| 2004/0065873 A1* | 4/2004 | Peterson | B66D 1/485 | 254/276 |
| 2004/0218406 A1* | 11/2004 | Jang | H02J 5/005 | 363/37 |
| 2005/0024231 A1* | 2/2005 | Fincher | E21B 17/028 | 340/854.4 |
| 2006/0159158 A1* | 7/2006 | Moore | G06F 1/1632 | 375/130 |
| 2006/0194537 A1* | 8/2006 | McCoy | H04B 13/02 | 455/40 |
| 2007/0188290 A1* | 8/2007 | Nakasuji | H01H 36/0066 | 337/1 |
| 2009/0058675 A1* | 3/2009 | Sugiura | E21B 17/028 | 340/854.8 |
| 2009/0102590 A1* | 4/2009 | Rhodes | H01F 38/14 | 336/107 |
| 2010/0156193 A1* | 6/2010 | Rhodes | G06F 1/1632 | 307/104 |
| 2010/0224356 A1* | 9/2010 | Moore | E21B 4/02 | 166/65.1 |
| 2010/0314106 A1* | 12/2010 | Tubel | E21B 17/20 | 166/250.1 |
| 2011/0031928 A1* | 2/2011 | Soar | F41G 1/34 | 320/108 |
| 2011/0076940 A1* | 3/2011 | Rhodes | H01Q 1/04 | 455/40 |
| 2011/0287712 A1* | 11/2011 | Conway | H04B 5/0093 | 455/41.1 |
| 2011/0298422 A1* | 12/2011 | Failing | B60L 3/00 | 320/109 |
| 2011/0304296 A1* | 12/2011 | Buelow, II | H01M 10/465 | 320/101 |
| 2012/0032632 A1* | 2/2012 | Soar | H01F 38/14 | 320/108 |
| 2012/0105246 A1* | 5/2012 | Sexton | H04B 13/02 | 340/850 |
| 2012/0170418 A1* | 7/2012 | Rhodes | H01Q 1/04 | 367/131 |
| 2012/0170935 A1* | 7/2012 | Machado | H04B 13/02 | 398/58 |
| 2012/0175969 A1* | 7/2012 | Maughan | H01F 38/14 | 307/104 |
| 2013/0217336 A1* | 8/2013 | McCormack | H04W 8/085 | 455/41.2 |
| 2013/0321223 A1* | 12/2013 | Bokenfohr | H04B 13/02 | 343/719 |
| 2014/0170982 A1* | 6/2014 | McCormack | H04W 8/085 | 455/41.2 |
| 2014/0184421 A1* | 7/2014 | Choudhury | H04B 13/02 | 340/850 |
| 2014/0248801 A1* | 9/2014 | Riezebos | H04B 5/0031 | 439/607.01 |
| 2014/0310433 A1* | 10/2014 | Preusser | H04W 52/0261 | 710/12 |
| 2014/0335703 A1* | 11/2014 | Calvin | H01R 13/6205 | 439/39 |
| 2015/0084783 A1* | 3/2015 | Maxwell | G01V 3/20 | 340/855.8 |
| 2015/0186478 A1* | 7/2015 | Yan | G06F 17/30268 | 707/722 |
| 2015/0296553 A1* | 10/2015 | DiFranco | H04W 76/023 | 455/41.2 |
| 2016/0028238 A1* | 1/2016 | Isfeldt | G01V 1/38 | 320/108 |
| 2016/0069674 A1* | 3/2016 | Govoni | H04W 4/02 | 702/150 |
| 2017/0033617 A1* | 2/2017 | Edwards | H02J 50/80 | |
| 2017/0170879 A1* | 6/2017 | Weaver | H04B 5/0037 | |

* cited by examiner

SUBSEA CONTACTLESS CONNECTOR SYSTEM AND METHOD WITH EXTREMELY HIGH DATA TRANSFER RATE

RELATIONSHIP TO PRIOR APPLICATIONS

This application claims the benefit of U.S. Provisional Application 62/266,267 filed on Dec. 11, 2016.

BACKGROUND

Underwater vehicles can collect large amounts of data during the time they are deployed. Downloading this data typically requires plugging in an external connector or the data recorder has to be removed and the data downloaded elsewhere. Either approach can take a long time and negatively impacts the available operational time. Further, wet mate underwater connectors are expensive and prone to failure.

Moreover, underwater sensors that are not connected to a surface recorder or collector need to have their data downloaded. A remotely operated vehicle (ROV) or autonomously operated vehicle (AUV) can be used, but depending on the volume of data to be downloaded, it may take an inordinate amount of time. While a ROV is not powered limited, the AUV is battery powered and spending a long period of time downloading data has an impact on its operational time.

FIGURES

The various drawings supplied herein describe and are representative of exemplary embodiments of the invention and are described as follows.

BRIEF DESCRIPTION OF EMBODIMENTS

Figure 1:
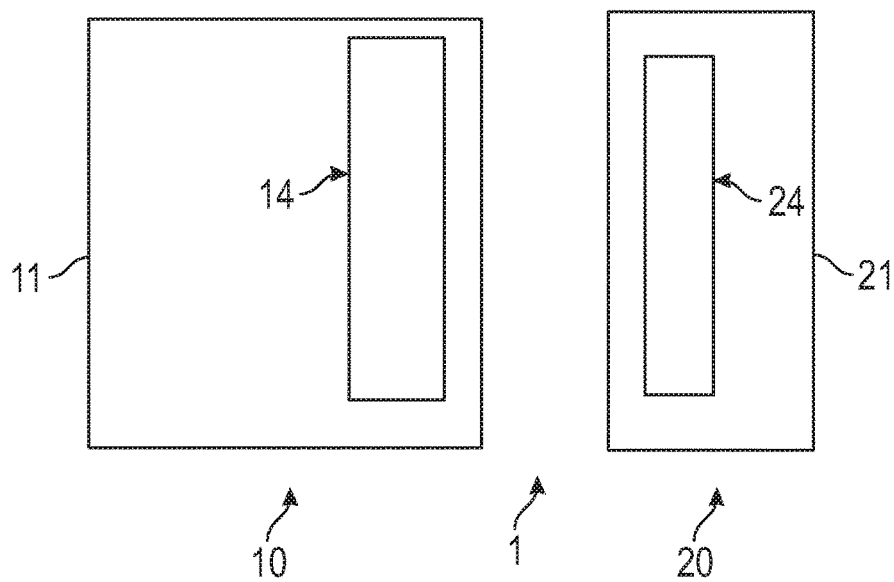
FIG. 1 is a block diagram of an exemplary connector.

Referring now to FIG. 1, in a first embodiment pinless connector 1 for subsea data communications comprises contactless connectivity data transmitter coupler 10 and contactless connectivity data receiver coupler 20 which can allow for rapid collection and/or download data from subsea vehicles or sensors without having to plug in an external connector or physically remove the data recorder from the unit.

Contactless connectivity data transmitter coupler 10 typically comprises first environmentally sealed housing 11 which has no exposed metal. First solid state contactless connectivity data transmitter 14, which may be a transceiver, is typically at least partially disposed within first environmentally sealed housing 11. Typically, first solid state contactless connectivity data transmitter 14 is configured to be operative at a low power level, e.g. less than or around 50 milliwatts, at an extremely high data transfer rate.

Contactless connectivity data receiver coupler 20 typically comprises second environmentally sealed housing 21 which has no exposed metal. First solid state contactless connectivity data receiver 24, which may be a transceiver, is disposed at least partially within second environmentally sealed housing 21 and is typically configured to be operative at the low power level and at the extremely high data transfer rate when first solid state contactless connectivity data transmitter 24 is disposed proximate first environmentally sealed housing 11, typically at a distance of no more than around 1 meter from first solid state contactless connectivity data transmitter 14. Typically, however, first environmentally sealed housing 11 and second environmentally sealed housing 21 are in contact, although first solid state contactless connectivity data transmitter 14 and first solid state contactless connectivity data receiver 24 need not be.

First environmentally sealed housing 11 and second environmentally sealed housing 21 are configured for use subsea, which can include being configured for use at depths of up to around 12000 feet or at full ocean depth, and each typically comprises a material suitable for use subsea, e.g. first environmentally sealed housing 11 comprises a first material and second environmentally sealed housing 21 comprises a second material which may be the same as the first material. The first and second materials suitable for use subsea may comprise a plastic, rubber, ceramic, glass, or the like, or a combination thereof.

In certain embodiments, first solid state contactless connectivity data transmitter 14 and first solid state contactless connectivity data receiver 24 are adapted to exchange data using a point to point data communications pathway. Keyssa, Inc. of Campbell, Calif. makes exemplary solid state contactless connectivity data transmitters and solid state contactless connectivity data receivers. In most configurations, first solid state contactless connectivity data transmitter 14 and first solid state contactless connectivity data receiver 24 are adapted to exchange data without requiring critical alignment of first solid state contactless connectivity data transmitter 14 with the first solid state contactless connectivity data receiver 24.

As used herein, the extremely high data transfer rate may be around 5 Gbits/second.

In certain embodiments, first environmentally sealed housing 11 and second environmentally sealed housing 21 are configured to mate cooperatively but do not have to mate at all, i.e., in various embodiments first solid state contactless connectivity data transmitter 14 and first solid state contactless connectivity data receiver 24 are operative to transfer data without being in physical contact with each other. However, in other contemplated embodiments first environmentally sealed housing 11 and second environmentally sealed housing 21 are configured to allow the first solid state contactless connectivity data transmitter 14 and the first solid state contactless connectivity data receiver 24 to come into physical contact with each other.

Figure 2:
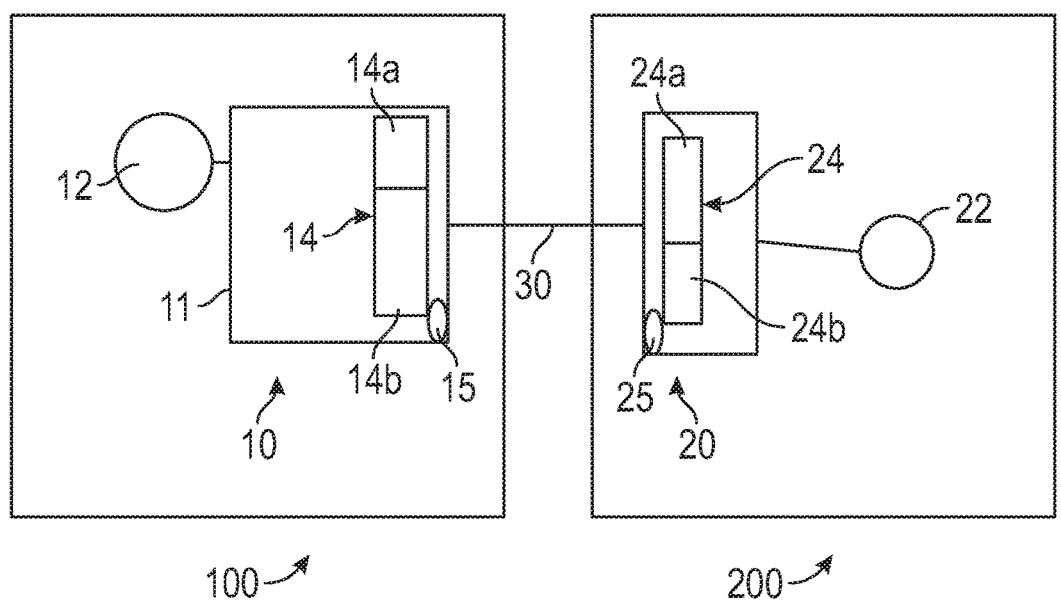
FIG. 2 is a block diagram of an exemplary system.

Referring additionally to FIG. 2, in certain embodiments, first solid state contactless connectivity data transmitter 14 may comprise a plurality of first solid state contactless connectivity data transmitters 14a,14b and/or first solid state contactless connectivity receiver 24 may comprise a plurality of first solid state contactless connectivity receivers 24a,24b. Typically, the plurality of first solid state contactless connectivity receivers 24a,24b are operatively coupled to corresponding first solid state contactless connectivity data transmitters 14a,14b of the plurality of first solid state contactless connectivity data transmitters and do not required critical alignment between the plurality of first solid state contactless connectivity data transmitters 14a,14b and the first solid state contactless connectivity receivers 24a, 24b. Use of a plurality of first solid state contactless connectivity data transmitters 14a,14b and a plurality of first solid state contactless connectivity receivers 24a,24b can allow data to be downloaded quicker by using multiple transmit/receive devices at the same time, either independently or cooperatively.

Referring still to FIG. 2, in a further embodiment a subsea system comprises first subsea device 100 and second subsea device 200. These devices can include structures such as blowout preventers, manifolds, Christmas trees, remotely operated vehicles, autonomously operated vehicles, or the like, or a combination thereof. Current subsea connectors are expensive due to the high tolerance required to ensure a watertight seal and are also the primary source of equipment failure due to water intrusion, misalignment, and the like.

First subsea device 100 comprises one or more first data collectors 12 and contactless connectivity data transmitter coupler 10, which is as described above.

Second subsea device 200 comprises contactless connectivity data receiver coupler 20 which is as described above and which may be operatively in communication with second data collector 22. As used herein, a data collector may comprise a sensor, a data logger, other electrical and/or optic devices, or the like, or a combination thereof.

In certain embodiments, first electromagnetic inductive signal transmitter 15, which may be a resonant electromagnetic inductive signal transmitter, may be disposed at least partially within contactless connectivity data transmitter coupler 10 and a complimentary first electromagnetic inductive signal receiver 25, which may be a resonant electromagnetic inductive signal receiver, may be disposed at least partially within contactless connectivity data receiver coupler 20. First electromagnetic inductive signal transmitter 15 and first electromagnetic inductive signal receiver 25 are typically operative to unidirectionally or bidirectionally transmit a signal such as a power signal when contactless connectivity data transmitter coupler 10 is disposed proximate contactless connectivity data receiver coupler 20. It will be understood by one or ordinary skill in electromechanical arts that bidirectional transmission requires first electromagnetic inductive signal transmitter 15 and first electromagnetic inductive signal receiver 25 to effectively be electromagnetic inductive signal transceivers.

Referring still to FIG. 2, current subsea fiber optic connectors are very expensive due to the high tolerance required to ensure alignment of the fibers. Alignment of fibers is critical and any misalignment can cause failure or significantly lower the operating capacity of the connector. These connectors have a limited number of mate and de-mate cycles. In addition, current cables used in subsea applications can be molded or pressure balanced oil filled (PBOF). Making each cable can be time consuming and expensive to ensure there is no water intrusion when submerged. Cables can deteriorate due to age, exceeding the bend radius, etc. causing equipment failures and requiring replacement which can be costly.

In a further embodiment, in addition to first subsea device 100 and second subsea device 200, which are as described above, the subsea system may comprise one or more physical data pathways 30 which are operatively disposed intermediate first solid state data transmitter 14 and first solid state data receiver 24 where the one or more physical data pathways 30 are configured to provide a data communication path between first solid state data transmitter 14 and first solid state contactless connectivity receiver 24 at the extremely high data rate at a distance of no more than around one meter subsea.

Each physical data pathway 30 may comprise a subsea fiber optic pathway, a subsea copper pathway, a plastic cable configured to act as a wave guide for a high frequency radio frequency signal, or the like, or a combination thereof. Typically, cable 30, including plastic cable 30, acts as a wave guide for the high frequency RF signals being transmitted and may only need to be jacketed to prevent the RF signal from leaking off or being interfered with by the environment.

If plastic cable 30 is used to transmit data signals, plastic cable 30 may be used with one or more plastic connectors to provide a low cost method for providing high speed data transmission from point to point. Plastic cable 30 may also be used to replace the fiber optic cable used in umbilicals/tethers on subsea vehicles. If a plastic cable is used, it typically comprises a jacket configured to prevent a radio frequency data signal from leaking off or being interfered with by the subsea environment.

In embodiments, physical data pathway 30 is configured to provide a data communication path between first solid state data transmitter 14a,14b and first solid state contactless connectivity receiver 24a,24b without requiring physical contact between physical data pathway 30 and at least one of first solid state data transmitter 14a,14b and first solid state contactless connectivity receiver 24a,24b. It is understood that first solid state data transmitter 14a,14b may be one or more first solid state data transmitters 14 and first solid state contactless connectivity receiver 24a,24b may be one or more first solid state contactless connectivity receivers 24 as described herein.

In embodiments, fiber optic connectors may be replaced with similar connectors having the same advantages as copper based signal connector. These can further operate to eliminate fiber optic connections and loss issues. Additionally, 100% plastic wet cabling and connectors may be for communications, e.g. plastic core cable used as waveguide to carry signal. Use of this technology and the connectors can allow use of extremely fast data ports and provide for rapid downloading of data to or from AUVs and remote sensors.

Figure 3:
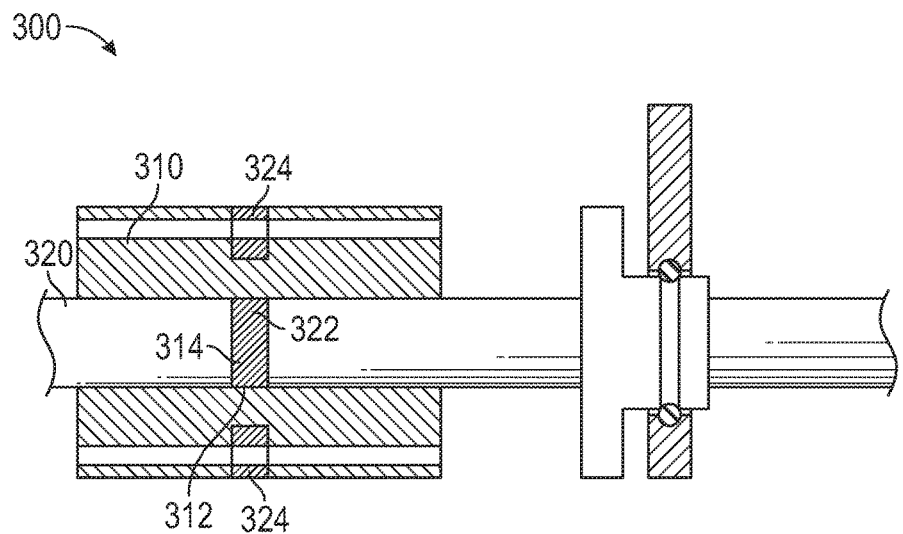
FIG. 3 is a block diagram of a first exemplary slip ring system.
Figure 4:
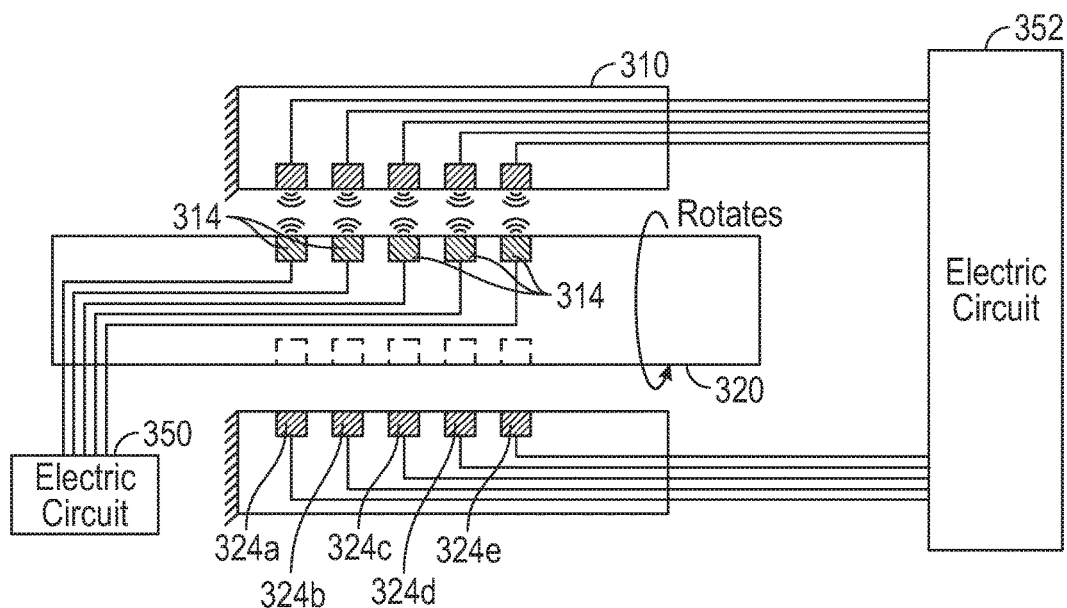
FIG. 4 is a block diagram of a second exemplary slip ring system.

Referring now to FIGS. 3 and 4, in a further embodiment slip ring system 300 comprises one or more first solid state contactless connectivity transmitters 314 mounted to or on one or more rotatable rings 322 and one or more non-contact stationary sensors, e.g. first solid state contactless connectivity receivers 324. Slip rings, which are widely used in numerous applications winches, cable reels, alternators, and the like, are an electromechanical device that allows the transmission of power and electrical signals from a stationary structure to which a stationary non-contact sensor may be fixed, to a rotating structure. A slip ring typically consists of a stationary contact point that rubs against the outside diameter of a rotating metal ring. Also known as rotary joints, slip rings are used in any electromechanical system that needs to rotate while transmitting power or signals.

In embodiments fiber-optic slip rings may be replaced with slip ring 300 which can provide a non-contact method to transmit data between stationary part 310 and moving part 320. By not having to use any direct contact method there are no parts to wear out which will greatly improve the reliability and overall performance of the slip ring.

Typically, slip ring 322 is fabricated without any contact parts to fail or wear out as well as the ability to rapidly transfer gigabyte amounts of data from an AUV or remote sensor in just seconds.

Each rotatable ring 320 typically comprises one or more sensor triggers 312 and first solid state contactless connectivity transmitters 314, which can be transceivers, operatively coupled to one or more sensor triggers 312 which are operatively in communication with one or more first electric circuits 352, where first solid state contactless connectivity transmitters 314 are configured to be operative at an extremely high data transfer rate.

Each non-contact stationary sensor can comprise one or more first solid state contactless connectivity receivers 324 which are typically responsive to one or more sensor triggers 312 and disposed at a predetermined position proximate an outside diameter of rotatable ring 320. A non-contact stationary sensor comprises one or more first solid state contactless connectivity receivers 324 configured to exchange data, either uni- or bidirectionally, with one or more first solid state contactless connectivity transmitters 314 at a low power level, typically less than or around 50 milliwatts, at the extremely high data transfer rate when disposed proximate to first solid state contactless connectivity transmitter 314 without the first solid state contactless connectivity transmitter having to physically contact the first solid state contactless connectivity receiver. As illustrated in FIG. 4, a plurality of first solid state contactless connectivity transmitters 314 may be disposed about shaft 320 and associated with one or more stationary mounted first solid state contactless connectivity receivers 324 and with one or more second electric circuits 350.

In the operation of exemplary embodiments, referring generally to FIG. 2, data may be obtained from one or more subsea data collector by disposing first subsea device 100 and second subsea device 200 subsea, where each is as described above. First subsea device 100 and second subsea device 200 are maneuvered into a position closely proximate each other subsea and contactless connectivity data transmitter coupler 10 positioned proximate contactless connectivity data receiver coupler 20 at a separation distance of not more than around one meter subsea. When positioned, first environmentally sealed housing 11 may be selectively and cooperatively mated with second environmentally sealed housing 21, but need not be. Typically, data may be exchanged between first solid state contactless connectivity transmitter 14 and first solid state contactless connectivity receiver 24 without requiring physical contact between first solid state contactless connectivity transmitter 14 and first solid state contactless connectivity receiver 24. However, in contemplated embodiments first solid state contactless connectivity transmitter 14 and first solid state contactless connectivity receiver 24 may be placed into physical contact.

Once positioned, first solid state contactless connectivity transmitter 14 and first solid state contactless connectivity receiver 14 are used to communicate data at the extremely high data transfer rate, such as by using a point to point data communication pathway which can include a physical pathway such as physical data pathway 30.

As described above, first solid state contactless connectivity data transmitter 14 may comprise a plurality of first solid state contactless connectivity data transmitters 14a,14b (FIG. 2) and first solid state contactless connectivity receiver may comprise a plurality of solid state contactless connectivity receivers 24a,24b (FIG. 2). In these embodiments, once positioned the plurality of solid state contactless connectivity receivers 24a,24b may be operatively coupled to corresponding ones of the plurality of first solid state contactless connectivity data transmitters 14a,14b. The plurality of first solid state contactless connectivity data transmitters 14a,14b and the plurality of first solid state contactless connectivity receivers 24a,24b may be used to unidirectionally or bidirectionally exchange data, whether synchronously or concurrently or independently, without a need for critically aligning the plurality of first solid state contactless connectivity data transmitters 14a,14b and the plurality of first solid state contactless connectivity receivers 24a,24b. Data communication may comprise using an industry standard data exchange protocol such as at an extremely high frequency data rate of around 5 Gbits/second.

In certain embodiments, first solid state contactless connectivity transmitter 14 and first solid state contactless connectivity receiver 24 are configured to connect automatically when they are in close proximity to one another and to and disconnect when the separation distance exceeds a maximum separation distance, e.g. more than around one meter.

Where first electromagnetic inductive signal transmitter 15 and first electromagnetic inductive signal receiver 25 are present, a signal such as a power signal may be exchanged between first electromagnetic inductive signal transmitter 15 and first electromagnetic inductive signal receiver 25, either uni- or bi-directionally, when contactless connectivity data transmitter coupler 10 is disposed proximate contactless connectivity data receiver coupler 20 at a separation distance of not more than around one meter subsea.

Referring to FIGS. 3 and 4, a signal may be transmitted from a relatively stationary device, e.g. housing 310, to a rotating ring such as slip ring 320, by disposing a rotatable ring, e.g. one or more first solid state contactless connectivity transmitters 314, on rotatable member 320 such that rotation of rotatable member 320 creates a corresponding rotation of first solid state contactless connectivity transmitters 324 operatively coupled to one or more sensor triggers 312 and operative at an extremely high data transfer rate. Sensor trigger 312 is as described herein and comprises one or more first solid state contactless connectivity transmitters 324 at a predetermined relatively stationary position proximate an outside diameter of rotatable shaft 320. First solid state contactless connectivity transmitter 314 and first solid state contactless connectivity receiver 324 are used to transmit a signal such as a data signal between the non-contact sensor and rotatable ring using a point-to-point connection at the extremely high data transfer rate, e.g. around 5 GBits per second, without first solid state contactless connectivity transmitter 314 having to physically contact first solid state contactless connectivity receiver 324. Transmission of the signal may comprise using an industry standard data exchange protocol.

In embodiments, first solid state contactless connectivity transmitter 314 and first solid state contactless connectivity receiver 324 connect and disconnect automatically when they are in close proximity to one another.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A pinless connector for subsea data communications, comprising:
  a. a contactless connectivity data transmitter coupler, comprising:
    i. a first environmentally sealed housing with no exposed metal, the first environmentally sealed housing comprising a first material suitable for use subsea; and
    ii. a first solid state contactless connectivity data transmitter at least partially disposed within the first environmentally sealed housing, the first solid state contactless connectivity data transmitter configured to be operative at a low power level of less than around 50 milliwatts at an extremely high data transfer rate of at least around 5 Gbits/second; and
  b. a contactless connectivity data receiver coupler, comprising:
    i. a second environmentally sealed housing with no exposed metal, the second environmentally sealed housing comprising a second material suitable for use subsea; and
    ii. a first solid state contactless connectivity data receiver disposed at least partially within the second environmentally sealed housing, the first solid state contactless connectivity data receiver configured to be operative at the low power level and at the extremely high data transfer rate when the first solid state contactless connectivity data transmitter is disposed proximate the first housing disposed at a distance of no more than around 1 meter from the first solid state contactless connectivity data transmitter.

2. The pinless connector for subsea data communications of claim 1, wherein the first material suitable for use subsea and/or the second material suitable for use subsea comprises a plastic.

3. The pinless connector for subsea data communications of claim 1, wherein the first environmentally sealed housing and the second environmentally sealed housing are configured for use subsea at depths of up to around 12000 feet.

4. The pinless connector for subsea data communications of claim 1, wherein the first solid state contactless connectivity data transmitter and the first solid state contactless connectivity data receiver are adapted to exchange data using a point to point data communications pathway.

5. The pinless connector for subsea data communications of claim 1, wherein the first solid state contactless connectivity data transmitter and the first solid state contactless connectivity data receiver are adapted to exchange data without requiring critical alignment of the first solid state contactless connectivity data transmitter and the first solid state contactless connectivity data receiver.

6. The pinless connector for subsea data communications of claim 1, wherein:
  a. the first solid state contactless connectivity data transmitter comprises a first transceiver; and
  b. the first solid state contactless connectivity data receiver comprises a second transceiver.

7. The pinless connector for subsea data communications of claim 1, wherein the first environmentally sealed housing and the second environmentally sealed housing are configured to mate cooperatively.

8. The pinless connector for subsea data communications of claim 1, wherein the first solid state contactless connectivity data transmitter and the first solid state contactless connectivity data receiver are operative to transfer data without being in physical contact with each other.

9. The pinless connector for subsea data communications of claim 1, wherein the first environmentally sealed housing and the second environmentally sealed housing are configured to allow the first solid state contactless connectivity data transmitter and the first solid state contactless connectivity data receiver to come into physical contact with each other.

10. A subsea system, comprising:
  a. a first subsea device comprising:
    i. a first data collector; and
    ii. a contactless connectivity data transmitter coupler, comprising:
      1. a first environmentally sealed housing with no exposed metal, the first environmentally sealed housing comprising a first material suitable for use subsea; and
      2. a plurality of first solid state contactless connectivity data transmitters at least partially disposed within the first environmentally sealed housing, each first solid state contactless connectivity data transmitter configured to be operative at a low power level of less than around 50 milliwatts and at an extremely high data transfer rate of at least around 5 Gbits/second; and
  b. a second subsea device, comprising a contactless connectivity data receiver coupler, the contactless connectivity data receiver coupler comprising:
    i. a second environmentally sealed housing with no exposed metal, the first environmentally sealed housing comprising a second material suitable for use subsea; and
    ii. a plurality of first solid state contactless connectivity data receivers disposed at least partially within the second environmentally sealed housing, each first solid state contactless connectivity data receiver operatively coupled to a corresponding first solid state contactless connectivity data transmitter of the the plurality of first solid state contactless connectivity data transmitters without requiring critical alignment between the plurality of first solid state contactless connectivity data transmitters and the first solid state contactless connectivity receivers, each first solid state contactless connectivity data receiver configured to be operative at the low power level and at the extremely high data transfer rate when its corresponding first solid state contactless connectivity data transmitter is disposed at a distance of no more than one meter from that first solid state contactless connectivity data transmitter.

11. The subsea system of claim 10, wherein the first solid state contactless connectivity data transmitter and the first solid state contactless connectivity data receiver are operative to exchange data without requiring physical contact between the first solid state contactless connectivity data transmitter and the first solid state contactless connectivity data receiver.

12. The subsea system of claim 10, wherein each of the first solid state contactless connectivity data transmitter and the first solid state contactless connectivity data receiver comprises a transceiver.

13. The subsea system of claim 10, wherein the first solid state contactless connectivity data transmitter and the first solid state contactless connectivity data receiver are adapted to exchange data without requiring critical alignment of the first solid state contactless connectivity data transmitter and the first solid state contactless connectivity data receiver.

14. The subsea system of claim 10, wherein the first solid state contactless connectivity data transmitter and the first solid state contactless connectivity data receiver are adapted to exchange data when physical contact exists between the first environmentally sealed housing and the second environmentally sealed housing.

15. The subsea system of claim 10, wherein the first environmentally sealed housing and the second environmentally sealed housing each comprises a plastic.

16. The subsea system of claim 10, wherein the first environmentally sealed housing and the second environmentally sealed housing are configured for use subsea at depths of up to around 12000 feet.

17. The subsea system of claim 10, wherein the first environmentally sealed housing is configured to cooperatively mate with the second environmentally sealed housing.

18. The subsea system of claim 10, wherein the extremely high data transfer rate is around 5 Gbits per second.

19. The subsea system of claim 10, wherein the low power level comprises a power level of less than or around 50 milliwatts.

20. The subsea system of claim 10, further comprising:
    a. a first electromagnetic inductive signal transmitter disposed within the contactless connectivity data transmitter coupler; and
    b. a first electromagnetic inductive signal receiver disposed within the contactless connectivity data receiver coupler.

21. The subsea system of claim 20, wherein the signal comprises a power signal.

22. The subsea system of claim 20, wherein:
    a. the first electromagnetic inductive signal transmitter comprises a first resonant electromagnetic inductive signal transmitter; and
    b. the first electromagnetic inductive signal receiver comprises a first resonant electromagnetic inductive signal receiver.

23. The subsea system of claim 10, further comprising a physical data pathway comprising a plastic cable, the plastic cable comprising a jacket configured to prevent a radio frequency data signal from leaking off or being interfered with by the subsea environment, the physical data pathway operatively disposed intermediate the first solid state contactless connectivity data transmitter and the first solid state contactless connectivity data receiver and configured to provide a data communication path between the first solid state data transmitter and the first solid state contactless connectivity receiver at the extremely high data rate.

24. The subsea system of claim 23, wherein the physical data pathway comprises a subsea fiber optic pathway.

25. The subsea system of claim 23, wherein the physical data pathway comprises a subsea copper pathway.

26. The subsea system of claim 23, wherein the plastic cable is configured to act as a wave guide for a high frequency radio frequency signal.

27. The subsea system of claim 23, wherein the physical data pathway is configured to provide a data communication path between the first solid state contactless connectivity data transmitter and the first solid state contactless connectivity receiver without requiring physical contact between the physical data pathway and at least one of the first solid state contactless connectivity data transmitter and the first solid state contactless connectivity receiver.

28. A method of obtaining data from a subsea data collector, comprising:
    a. disposing a first subsea device subsea, the first subsea device comprising:
        iii. a first data collector; and
        iv. a contactless connectivity data transmitter coupler, comprising:
            1. a first environmentally sealed housing with no exposed metal;
            2. a plurality of first solid state contactless connectivity data transmitters, each first solid state contactless connectivity data transmitter at least partially disposed within the first environmentally sealed housing and operatively in communication with the first data collector, each first solid state contactless connectivity data transmitter configured to be operative at a low power level of less than around 50 milliwatts using an extremely high frequency data transfer rate of at least around 5 Gbits/second;
    b. disposing a second subsea device subsea, the second subsea device comprising:
        v. a second data collector; and
        vi. a contactless connectivity data receiver coupler, comprising:
            1. a second environmentally sealed housing with no exposed metal; and
            2. a plurality of first solid state contactless connectivity data receivers disposed at least partially within the second environmentally sealed housing and operatively coupled to corresponding ones of the plurality of first solid state contactless connectivity data transmitters, each first solid state contactless connectivity data receiver configured to be operative at the low power level using the extremely high data transfer rate when disposed proximate to the contactless connectivity data transmitter coupler at a distance of no more than around one meter;
    c. positioning at least one of the first subsea device and the second subsea device into a position closely proximate each other subsea;
    d. positioning the contactless connectivity data transmitter coupler proximate the contactless connectivity data receiver coupler at a separation distance of not more than around one meter sub sea; and
    e. using the first solid state contactless connectivity transmitter and the first solid state contactless connectivity receiver to communicate and exchange data at the extremely high data transfer rate using a point to point data communication pathway without a need for critically aligning the plurality of first solid state contactless connectivity data transmitters and the plurality of first solid state contactless connectivity receivers.

29. The method of obtaining data from a subsea data collector of claim 28, wherein communication of the data at the extremely high data transfer rate comprises using an industry standard data exchange protocol.

30. The method of obtaining data from a subsea data collector of claim 28, wherein the first solid state contactless connectivity transmitter and the first solid state contactless connectivity receiver connect and disconnect automatically when they are in close proximity to one another.

31. The method of obtaining data from a subsea data collector of claim 28, wherein disposing the second subsea device subsea comprises cooperatively mating the first environmentally sealed housing and the second environmentally sealed housing.

32. The method of obtaining data from a subsea data collector of claim 28, wherein data are exchanged between the first solid state contactless connectivity transmitter and the first solid state contactless connectivity receiver without requiring physical contact between the first solid state contactless connectivity transmitter and the first solid state contactless connectivity receiver.

33. The method of obtaining data from a subsea data collector of claim 28, further comprising:
    a. disposing a first electromagnetic inductive signal transmitter within the contactless connectivity data transmitter coupler;
    b. disposing a first electromagnetic inductive signal receiver within the contactless connectivity data receiver coupler; and c. exchanging a signal between the first electromagnetic inductive signal transmitter and the first electromagnetic inductive signal receiver when the contactless connectivity data transmitter coupler is disposed proximate the contactless connectivity data receiver coupler.

* * * * *